(12) United States Patent
Lilie

(10) Patent No.: US 7,215,047 B2
(45) Date of Patent: May 8, 2007

(54) LINEAR MOTOR AND LINEAR COMPRESSOR INCLUDING SAID MOTOR

(75) Inventor: Dietmar Erich Bernhard Lilie, Joinville (BR)

(73) Assignee: Empresa Brasileira de Compressores S.A. -Embraco, Joinville -SC (BR)

( * ) Notice: Subject to any disclaimer, the term of this patent is extended or adjusted under 35 U.S.C. 154(b) by 271 days.

(21) Appl. No.: 10/477,902

(22) PCT Filed: May 13, 2002

(86) PCT No.: PCT/BR02/00068

§ 371 (c)(1),
(2), (4) Date: Jun. 30, 2004

(87) PCT Pub. No.: WO02/093714

PCT Pub. Date: Nov. 21, 2002

(65) Prior Publication Data

US 2004/0239192 A1 Dec. 2, 2004

(30) Foreign Application Priority Data

May 14, 2001 (BR) .................................. 0102566

(51) Int. Cl.
*H02K 33/16* (2006.01)
*H02K 1/18* (2006.01)
*F04B 35/04* (2006.01)

(52) U.S. Cl. .............................. 310/15; 310/23; 310/28; 417/417

(58) Field of Classification Search .................. 310/15, 310/23; 417/416, 417
See application file for complete search history.

(56) References Cited

U.S. PATENT DOCUMENTS 5,945,748 A 8/1999 Park et al.
(Continued)

FOREIGN PATENT DOCUMENTS

EP 0 954 086 A2 11/1999
(Continued)

OTHER PUBLICATIONS

Patent abstracts of Japan, vol. 2000, No. 13, Feb. 5, 2001 & JP 2000 297751 A (Matsushita Refrigeration Co Ltd), Oct. 24, 2000.

(Continued)

*Primary Examiner*—Burton Mullins
(74) *Attorney, Agent, or Firm*—Darby & Darby

(57) ABSTRACT

A linear motor and a linear compressor including said motor. The linear motor comprises a set of inner laminations (90), forming the stator, mounted around the outer circumference of a fixed member (60), and a set of outer laminations (30) mounted spaced from the inner laminations (90). An actuator (85) is connected to a movable member (80) and carries a magnet member (86) in the space defined between the inner laminations (90) and the outer laminations (30). The upper ends of the inner laminations (90) and outer laminations (30) are connected by a connecting element (100) made of a non-magnetic material, in order to stabilize the laminations and serve as a suspension mounting for the set of outer laminations (30). Application of electric current to a coil (95) causes the actuator (85) to move and carry the movable member (80) with it. The fixed member (60) is defined by the cylinder of the compressor and the movable member (80) by the piston, which is reciprocated inside the cylinder to compress a refrigerant gas, and the connecting element (100) does not contact the cylinder. This arrangement does not require any special configuration of the cylinder or use of an additional plate to provide the connection to the outer laminations.

11 Claims, 2 Drawing Sheets

U.S. PATENT DOCUMENTS

| | | |
|---|---|---|
| 6,209,328 B1 | 4/2001 | Kim et al. |
| 6,565,332 B2 * | 5/2003 | Kawahara et al. .......... 417/417 |
| 6,828,711 B2 * | 12/2004 | Lilie ........................... 310/254 |
| 2002/0135264 A1 * | 9/2002 | Song et al. .................. 310/254 |
| 2004/0141860 A1 * | 7/2004 | Puff et al. ................... 417/417 |

FOREIGN PATENT DOCUMENTS

WO          WO-01/29444 A1      4/2001

OTHER PUBLICATIONS

Patent abstracts of Japan, vol. 1999, No. 01, Jan. 29, 1999 & JP 10 285898 A (Nabco Ltd), Oct. 23, 1998.

* cited by examiner

LINEAR MOTOR AND LINEAR COMPRESSOR INCLUDING SAID MOTOR

This is a U.S. national phase application under 35 U.S.C. § 371 of International Patent Application No. PCT/BR02/000068 filed May 13, 2002, and claims the benefit of Brazilian Application No PI 0102566-0 filed May 14, 2001. The International Application was published in on Nov. 11, 2002 as International Publication No. WO/2002/093714 under PCT Article 21(2) the content of which is incorporated herein in its entirety.

FIELD OF THE INVENTION

The present invention relates to a linear motor presenting a simplified mounting of the laminations of the motor, in order to improve the efficiency of said motor, particularly when applied to linear compressors of small refrigeration systems.

BACKGROUND OF THE INVENTION

Electric linear motors are well known devices, in which one of a coil or magnet element is mounted to a fixed member, and the other element is mounted to a member to be moved. Electric current is applied to the coil, which generates magnetic lines of force to interact with the magnet to produce linear motion of the movable member. Such electric linear motors are generally used in refrigeration compressors in which the movable member is defined by the piston of the compressor and the magnet is mounted to said piston. The coil is fixedly mounted to an external portion of the compressor structure that forms the cylinder, inside which the piston is reciprocated.

FIG. 1 of the appended drawings illustrates a prior art linear compressor of the type disclosed in U.S. Pat. No. 5,945,748. In this known prior art construction, there is provided a hermetic shell 10, within which is mounted a cylindrical inner cup 20 that defines a predetermined inner space. A set of outer laminations 30 for a linear motor is affixed to the inner face of the inner cup 20. A disk shaped cover plate 40 has a hole in a center portion thereof and is connected to a flange 61 that is incorporated to the upper end of a cylinder 60 and to upper end portions of both the inner cup 20 and outer laminations 30. A lower cover 50, which is also disk shaped, is connected to the lower end portion of the inner cup 20. An upper portion of the cylinder 60 extends through the open center portion of the cover plate 40, and a valve system 70 is mounted to the center of the upper portion of the cylinder 60 to tightly cover the hole through which the upper portion of the cylinder 60 extends. A conventional valve plate having suction and discharge valves can also be used. Inside the cylinder 60 is mounted a piston 80 which, upon being reciprocated by the linear motor, compresses a refrigerant gas in a known manner. A set of inner laminations 90 of the linear motor is mounted around a portion of an outer circumferential surface of the cylinder 60, said internal laminations 90 maintaining a predetermined spacing from the set of outer laminations 30.

A coil 95, of toroidal shape, is located in a cut-out portion of an outer circumferential surface of the inner laminations 90, and the ends of the coil 95 are connected to lead wires (not shown) that supply electric current to the coil 95. If desired, the coil 95 can also be located on the set of outer laminations 30. A connecting member in the form of a disk connects the lower end of the piston 80 to a cylindrical actuator 85, to the upper end of which is attached a magnet member 86 usually formed by a plurality of permanent magnets (not shown). The magnet member 86 moves in the space between the sets of outer laminations 30 and inner laminations 90.

As seen from FIG. 1, the linear motor includes the set of outer laminations 30, the set of inner laminations 90 carrying the coil 95, and also the actuator 85, to which the magnet member 86 is attached.

Inner helical springs 66 are provided between the connecting member 65 and a support 68 that is affixed to the bottom of the set of inner laminations 90 to elastically support the reciprocation of the piston 80. Outer helical springs 67 are disposed between the connecting member 65 and the lower cover 50 to support the compressor as the piston 80 reciprocates. At least one refrigerant gas path 80a is provided along an upper portion of the cylinder 60 for admitting refrigerant gas into the latter at a determined position of the piston 80.

In the operation of the compressor illustrated in FIG. 1, when electric current is supplied to the coil 95, the magnet member 86, mounted to the actuator 85, reacts with the magnetic lines of force and reciprocates the actuator 85 in a straight line between the inner laminations 90 and the outer laminations 30, whereby the piston 80 is reciprocated in the cylinder 60 as a function of the corresponding displacement of the actuator 85. The refrigerant gas flows into the cylinder 60 through the refrigerant gas paths 80a provided in the cylinder 60. The refrigerant gas compressed in the cylinder 60 is discharged through the valve system 70, and the above described operation is repeatedly performed.

The inner laminations 90 may be mounted to the cylinder by using any one of the constructions presently known, such as the one illustrated in FIG. 1. For example, there can be provided a molded bracket member mounted to the cylinder and carrying the inner laminations 90, these laminations having a cut-out in the outer surfaces thereof for lodging the coil 95.

FIG. 1A illustrates a type of mounting that can be used for mounting the outer laminations 30. This figure illustrates a modification of an arrangement shown in said US patent. The outer laminations 30, made of a magnetic metal, such as iron or steel, are radially disposed relative to the center of the compressor. A tubular frame 25 is mounted internal of the wall of the inner cup 20 and carries a shelf 26 onto which is mounted the lower end of each outer lamination 30, and the tubular frame 25 is further provided with an upper bracket 27 to connect the upper end of the outer laminations 30. Nevertheless, it should be understood that any suitable mounting arrangement might be used for adequately securing the outer laminations 30 to the wall of the inner cup 20.

As seen in the compressor of FIG. 1, the cylinder 60 is formed with a flange 61 extending radially outwardly from the top of the cylinder 60, and the cover plate 40 provides a connection between the flange 61 of the cylinder 60 and the outer laminations 30. As described below, this known construction gives rise to various problems.

FIG. 2 shows a part of another type of prior art compressor formed by a cylinder 60, to whose outer face is affixed, by glue or any other fixing means, a linear motor, whose stator comprises inner laminations 90 having an external cut-out for housing a toroidal coil 95, as already described in relation to FIG. 1. The upper ends of a set of outer laminations 30 are directly affixed, by glue, welding or any other fixing means, to the inner surface of an external portion of a flange 61 incorporated to the cylinder 60 and extending radially outwardly therefrom, in order to provide a suspension mounting to the outer laminations 30. The lower surface of the flanges 61 also contacts the tops of the inner laminations 90. Thus, there is provided a direct connection between the flange 61 of the cylinder 60 and the outer laminations 30 and the inner laminations 90.

Heretofore the linear motor has been described as used in a linear compressor. However, such linear motors also find use in other devices. For example, a stationary bushing can replace the cylinder 60 of the compressor and the piston of the latter can be replaced by a shaft that can be reciprocated to perform a determined work as the linear motor operates. Such other devices may require arrangements for mounting the inner and outer laminations, and may present variations in the structural configurations thereof in relation to those illustrated in FIGS. 1, 1A and 2. However, all these known variations use a direct connection between the three components that are, (or correspond to, in other devices) the cylinder 60 with its flange 61, the inner laminations 90, and the outer laminations 30 of the linear motor.

Such constructions, which are described particularly for the linear compressor, but have equivalent components in other useful devices, have the following disadvantages:

- a large amount of material is required for constructing the cylinder, since the cylinder must incorporate its radially outwardly projecting flange 61. Moreover, in the embodiment illustrated in FIG. 1, it is further required the provision of the cover plate 40.
- the cylinder must be made of a non-magnetic material, in order to avoid the flow of magnetic lines of force through the structure. This would generate Foucault currents producing heat and energy loss.
- the non-magnetic materials for producing the cylinder are usually of the austenitic type, or of various types of stainless steel or aluminum, among others, and all such materials being relatively expensive.
- the construction of the cover plate 40 and the flange 61 of the cylinder 60 present a large surface, causing undesired irradiation of noise.
- a large number of machining operations is needed to form the cylinders illustrated in FIGS. 1 and 2, as well as a large amount of investment in equipment to produce the cylinders.
- some non-magnetic materials used to produce the cylinder are inadequate for the components to be subjected to friction, as it occurs, for example, between the reciprocating piston and the cylinder, or between the reciprocating shaft and the stationary bushing, making necessary, in certain cases, to use a sleeve of a harder material for the cylinder or bushing. This makes the mounting operation more difficult, increasing the cost of the final product.

OBJECTS OF THE INVENTION

An object of the invention is to provide a linear motor having inner laminations 90 and outer laminations 30 connected by a ring member made of non-magnetic material and without using any connection to a fixed member inside which another member is reciprocated.

Yet another object of the invention is to provide a linear motor for a linear compressor formed by a set of inner laminations mounted to the cylinder, and a set of outer laminations, with the inner and outer laminations being connected by a non-magnetic connecting ring that stabilizes the laminations but does not make contact with any part of the compressor cylinder.

Still a further object of the invention is to provide a linear motor for a linear compressor that does not require any direct fixation to the cylinder to mount the laminations of the linear motor.

SUMMARY OF THE INVENTION

The linear motor of the invention is described as used with a linear compressor having a cylinder, within which a piston is reciprocated by a linear motor to compress refrigerant gas. The linear motor is formed by a set of inner laminations, defining a stator and mounted around the outer circumference of the cylinder, and a toroidal coil, which is constructed to receive electric current, is carried by the inner laminations. A set of outer laminations is mounted around the inner surface of a cup, inside which the compressor is housed. In some devices, there can be provided a second coil carried by the outer laminations, or the coil can be provided only in the set of outer laminations. An actuator is connected to the lower end of the piston and carries a magnet member in the space between the inner and outer laminations. Upon application of current to the coil, the actuator is caused to reciprocate, carrying the piston with it.

The upper ends of the inner and outer laminations are connected by a connecting ring made of a non-magnetic material that does not contact the cylinder. The connecting ring serves as a suspension mounting for the outer laminations, since the inner laminations are mounted to the fixed cylinder. This also provides stabilization for the sets of laminations. This arrangement does not require any special configuration of the cylinder or use of a separate cover plate. Therefore, the proposed solution is simple and inexpensive to make, and it provides additional advantages in that the cylinder and piston can be made of less expensive materials, such as cast iron or steel.

BRIEF DESCRIPTION OF THE DRAWINGS

Other objects and advantages of the present invention will become more apparent upon reference to the attached drawings, in which.

DETAILED DESCRIPTION OF THE DRAWINGS

Figure 3:
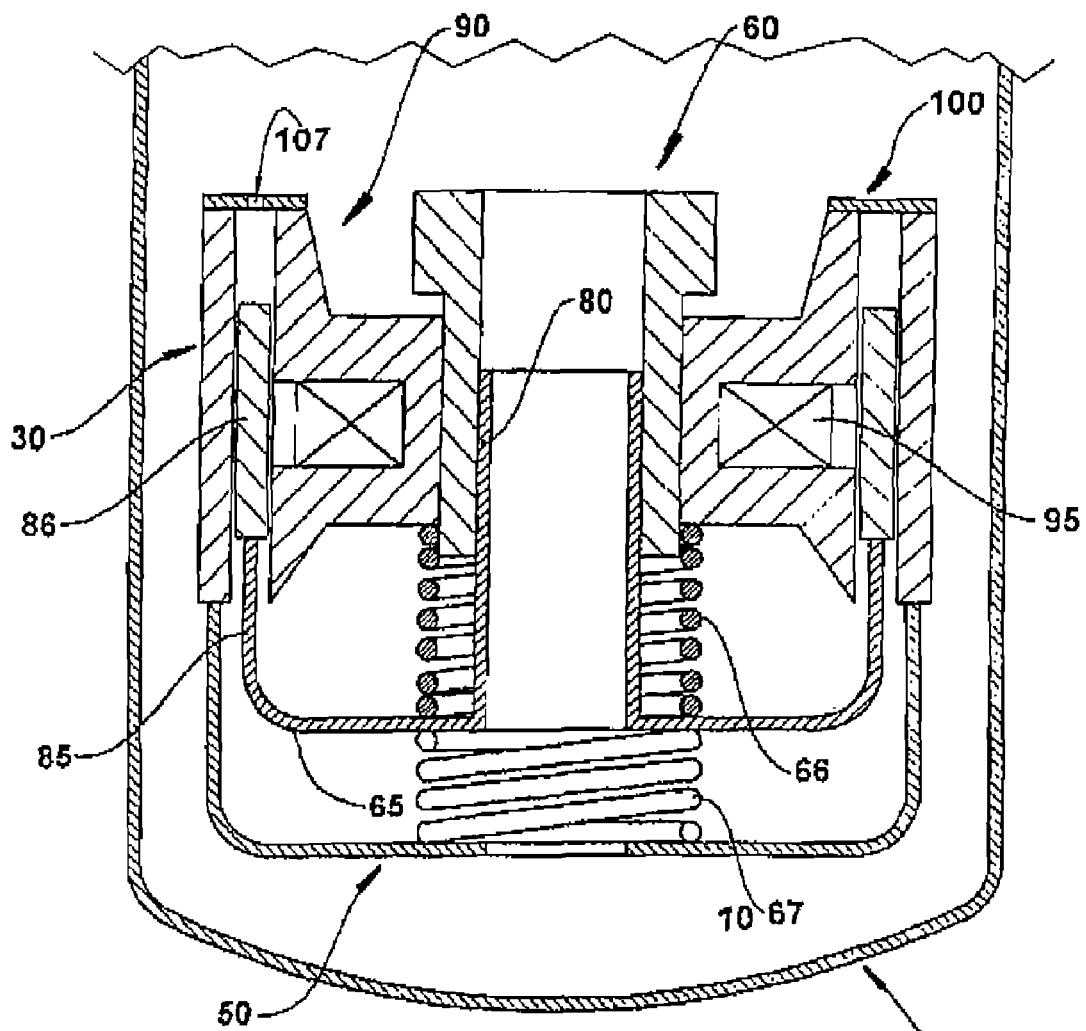
FIG. 3 is an elevational cross-sectional view of a portion of a linear compressor constructed according to the subject invention.

The linear motor of the present invention will be described below with respect to its application to a linear compressor. FIG. 3 shows an embodiment of the invention in which the same reference numbers are used for the same components previously described. According to the invention, the linear motor has a stator formed by a set of inner laminations 90 mounted onto the outer surface of a cylinder 60. Like in the compressor of FIG. 2, the inner laminations 90 have cut-outs in the outer surfaces thereof to house a coil 95, to which electric current is supplied. As illustrated, the cylinder 60 is of smaller size and of less complicated construction as compared to the cylinder 60 of the constructions illustrated in FIGS. 1 and 2, since the flange 61 is no longer required.

A set of outer laminations 30 secures, inferiorly, an upper portion of the inner cup 20. A connection is provided between the upper ends of the inner laminations 90 and the upper ends of the outer laminations 30 by a connecting element 100, which is shown in the form of a ring. The connecting element 100 may be a flat molded or stamped piece that is fastened to the upper ends of each of the inner laminations 90 and those of the outer laminations 30 by any suitable technique, such as by using an adhesive or by welding, depending on the materials used for the connecting element. The connecting element 100 operates as a suspension type mounting for the set of outer laminations 30, that is, it is secured to the set of inner laminations 90, which in turn is mounted to the stationary cylinder 60. Thus, the outer laminations 30 can be mounted without the use of a bracket such as that illustrated in FIG. 1. The connecting element 100 is made of a non-magnetic material, such as stainless steel, plastic, aluminum, etc. The connecting ring 100 is preferably provided with through holes 107 opened to the space within which the magnet member 86 moves in order to permit the passage of gas that is compressed by the magnet member 86 in said space.

Figure 1:
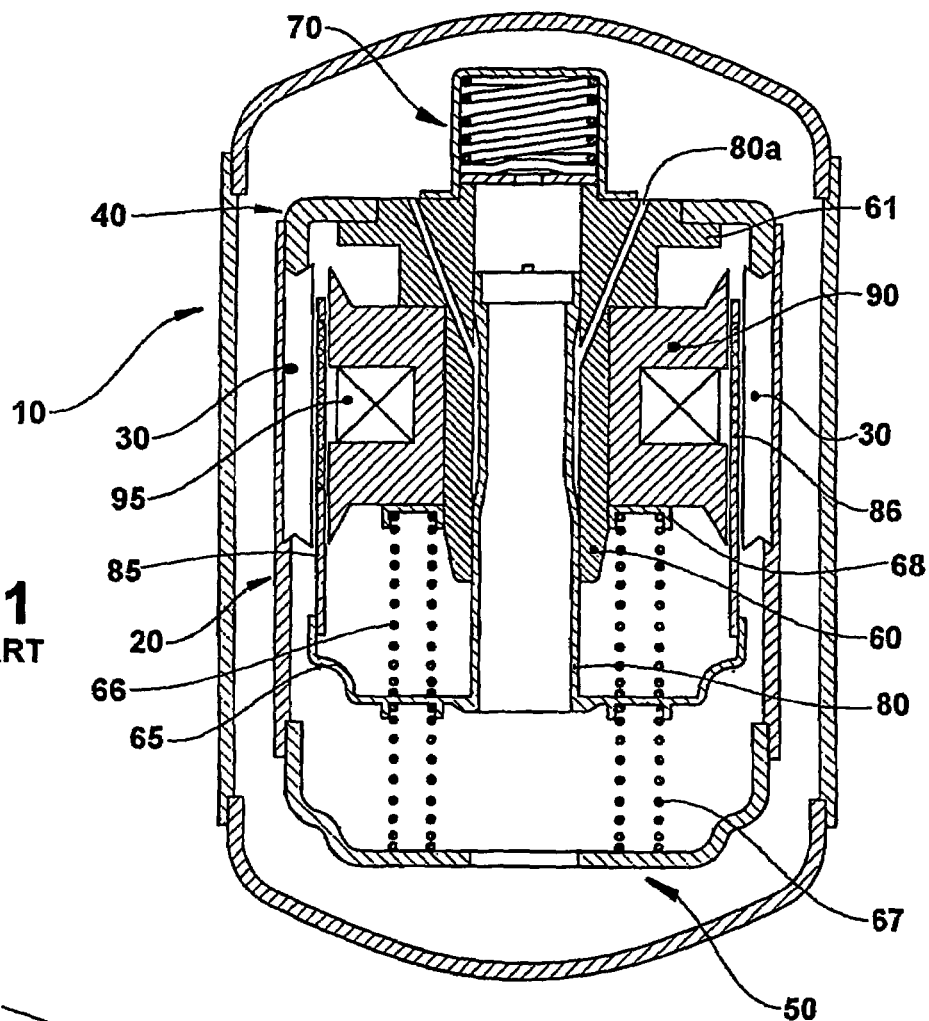
FIG. 1 is an elevational cross-sectional view of a first embodiment of a prior art linear compressor.
Figure 1A:
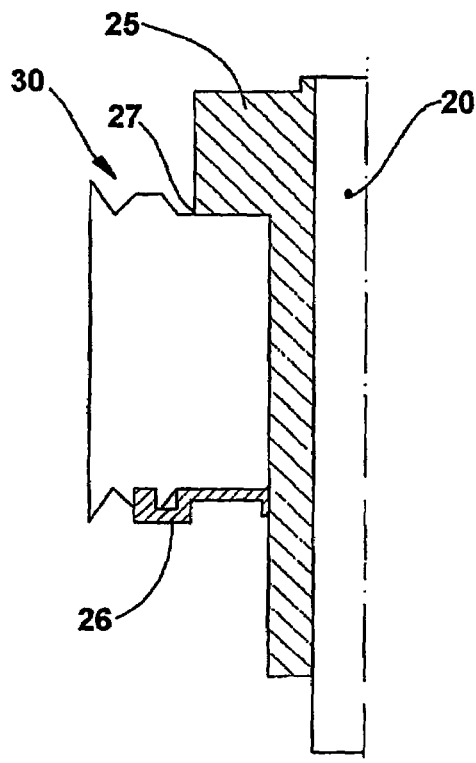
FIG. 1A is an elevational view of one type of mounting arrangement for the outer laminations of a linear motor according to the prior art.
Figure 2:
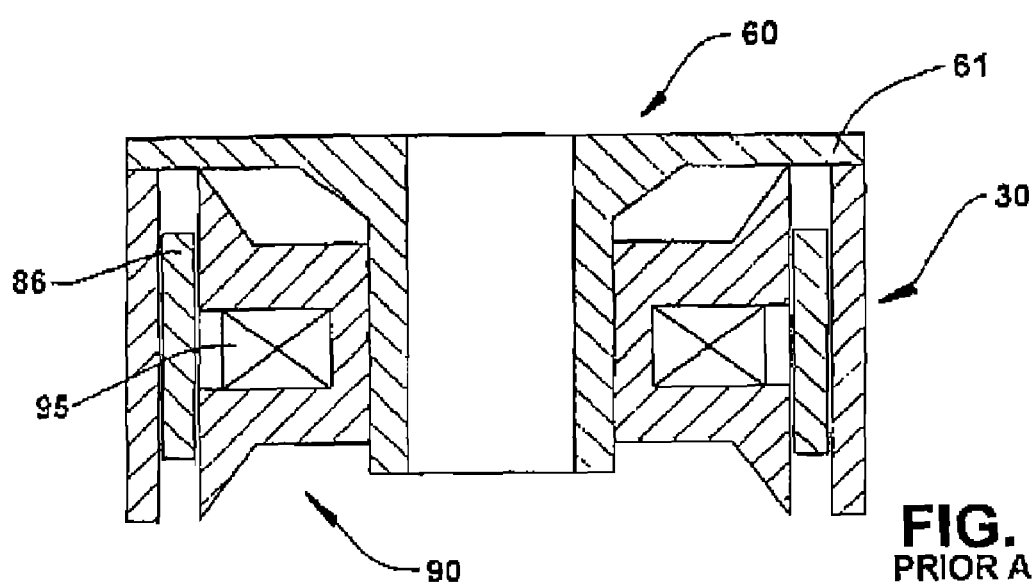
FIG. 2 is an elevational cross-sectional view of a portion of a linear compressor according to another embodiment of the prior art.

The construction of the present invention has several advantages, among which the following may be mentioned:

there is achieved a reduction in the size of the cylinder, since the flange 61 is no longer required, as contemplated in FIGS. 1 and 2. Also, no separate cover 40 is required, as contemplated in the compressor of FIG. 1.

the absence of the cylinder flange and/or cover plate eliminates a source of noise.

the cylinder 60 may be made of a magnetic material, such as steel or cast iron, which is less expensive than a non-magnetic material. Such metals are also more structurally reliable when subjected to friction by the reciprocating piston, which, in this case may also be made of steel or cast iron.

the linear motor remains magnetically insulated from the cylinder, since the connecting element 100 is of non-magnetic material. Therefore, no Foucault currents are generated.

the mounting of the various elements is simplified.

the production of the cylinder, as compared to the structures of the prior art cylinder, is simplified.

While the linear motor has been described to drive the piston of a linear compressor in the disclosed embodiment of the invention, it should be understood that this motor construction also can drive a different element instead of the piston, for example, a shaft of an equipment that reciprocates within a bushing in place of the compressor cylinder. In such devices, there is no need to provide a flange incorporated to the bushing or the cylinder to connect the laminations.

Specific features of the invention are shown in a figure of the drawings for convenience only, as each feature may be combined with other features according to the invention. Alternative embodiments will be recognized as possible by those skilled in the art and are intended to be included within the scope of the claims. Accordingly, the above description should be construed as illustrating and not limiting the scope of the invention. All such obvious changes and modifications are within the scope of the appended claims.

The invention claimed is:

1. A linear motor, comprising:
a stator formed by a set of inner laminations carrying a coil and attached to a fixed member, and a set of outer laminations spaced from the inner laminations, and
a magnet element carried by an actuator that is connected to reciprocate a movable member within the fixed member when electric current is applied to the coil, and
a connecting element in the form of a ring, connecting the outer laminations and the inner laminations said connecting element being spaced from and does not contact the fixed member.

2. The linear motor as set forth in claim 1, wherein the connecting element connects the top portions of the outer laminations with the top portions of the inner laminations and the actuator is connected to the movable member at a bottom of the linear motor.

3. The linear motor as set forth in claim 2, wherein said connecting element has though holes communicating with the space defined between the inner laminations and the outer laminations.

4. A linear compressor including the linear motor as defined in claim 3, wherein said fixed member is a cylinder of a compressor, said movable member being defined by a piston which is reciprocated in the cylinder by the linear motor.

5. The linear motor as set forth in claim 2, wherein said connecting element is made of a non-magnetic material.

6. A linear compressor including the linear motor as defined in claim 2, wherein said fixed member is a cylinder of a compressor, said movable member being defined by a piston which is reciprocated in the cylinder by the linear motor.

7. The linear motor as set forth in claim 1, wherein said connecting element is made of a non-magnetic material.

8. A linear compressor including the linear motor as defined in claim 7, wherein said fixed member is a cylinder of a compressor, said movable member being defined by a piston which is reciprocated in the cylinder by the linear motor.

9. A linear compressor including the linear motor as defined in claim 1, wherein said fixed member is a cylinder of a compressor, said movable member being defined by a piston which is reciprocated in the cylinder by the linear motor.

10. A linear motor comprising:
a stator including:
a set of inner laminations carrying a coil,
a fixed member attached to the inner laminations,
a set or outer laminations spaced from the inner laminations, and
a connecting element in the form of a ring, spaced from the fixed member and connecting the inner laminations to the outer laminations at a top side of the linear motor; and
a magnet element carried by actuator that is connected to a movable member at a bottom side of the linear motor, the movable member reciprocating within the fixed member when electric current is applied to the coil.

11. A linear motor comprising:
a stator including:
a set of inner laminations mounted around and onto an outer circumference of a cylinder of a compressor,
a set of outer laminations arranged radially outwardly spaced from said set of inner laminations, and a coil carried by one of the set of inner or the set of outer laminations;

a magnet carried by an actuator that is connected to reciprocate a piston within the cylinder when electric current is applied to the coil; and a connection element in form of a ring which does not contact the cylinder and is spaced therefrom, said connection element connecting the set of outer laminations and the set of inner laminations, wherein the set of outer laminations is suspended on and secured to the set of the inner laminations by said ring.

* * * * *